(12) United States Patent
Rocas

(10) Patent No.: US 8,537,386 B2
(45) Date of Patent: Sep. 17, 2013

(54) METHOD AND SYSTEM FOR GENERATING SMART BANNER PAGES FOR USE IN CONVEYING INFORMATION ABOUT A RENDERED DOCUMENT TO A USER

(75) Inventor: Marc Vinicio Rocas, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 926 days.

(21) Appl. No.: 12/124,831

(22) Filed: May 21, 2008

(65) Prior Publication Data

US 2009/0290186 A1    Nov. 26, 2009

(51) Int. Cl.
*G06F 3/12*    (2006.01)

(52) U.S. Cl.
USPC ........... 358/1.15; 358/1.1; 358/1.9; 358/1.13; 358/3.24

(58) Field of Classification Search
USPC ............... 358/1.15, 1.13, 1.14, 1.1, 1.9, 2.1, 358/3.11, 3.12, 3.23, 3.24, 1.11, 1.16, 1.18
See application file for complete search history.

(56) References Cited

U.S. PATENT DOCUMENTS

| | | | |
|---|---|---|---|
| 6,783,288 B2 * | 8/2004 | Kato | 400/61 |
| 6,981,015 B1 * | 12/2005 | Palmer et al. | 709/201 |
| 7,061,635 B1 * | 6/2006 | Wanda et al. | 358/1.15 |
| 2002/0186410 A1 * | 12/2002 | Tanaka | 358/1.15 |
| 2008/0043277 A1 | 2/2008 | Bystrom et al. | 358/1.15 |
| 2008/0049244 A1 | 2/2008 | Pangrazio et al. | 358/1.15 |
| 2008/0056738 A1 | 3/2008 | Horn | 399/16 |
| 2008/0065671 A1 | 3/2008 | Dejean et al. | 707/102 |
| 2008/0068417 A1 | 3/2008 | Cleary et al. | 347/16 |
| 2008/0068641 A1 | 3/2008 | Dance et al. | 358/1.15 |

* cited by examiner

*Primary Examiner* — Vu B Hang
(74) *Attorney, Agent, or Firm* — Kermit D. Lopez; Luis M. Ortiz; Kevin Soules

(57) ABSTRACT

A computer-implemented method and system for conveying information associated with a rendered job is disclosed herein. In general, data can be automatically generated, in response to a request by a user to render a job via a rendering device, wherein the data includes information indicative of the job. Thereafter, the data can be rendered for the user in a displayable format in association with the rendering of the job via the rendering device in order to convey to the user sufficient information indicative of how the job was processed and rendered via the rendering device in the event that the user encounters unexpected processing and rendering of the job.

17 Claims, 5 Drawing Sheets

METHOD AND SYSTEM FOR GENERATING SMART BANNER PAGES FOR USE IN CONVEYING INFORMATION ABOUT A RENDERED DOCUMENT TO A USER

TECHNICAL FIELD

Embodiments are generally related to rendering devices and techniques. Embodiments are additionally related to the field of computers and similar technologies and, in particular, to software utilized in this field. Embodiments are also related to the generation of print job banner pages.

BACKGROUND OF THE INVENTION

Rendering devices such as printers often utilize a client/server architecture that includes three primary components, including a client, a server and an output device. The client conveys a print and management request to the server and receives a response from the server that arises in response to requests submitted by the client. The server receives such requests from the client and performs required actions for each request and returns the responses to the client. One such request from the client is a print request, (i.e., a request to print one or more copies of one or more documents), with the printed pages output utilizing one or more features.

Print jobs sent to the printer undergo several steps to reconcile print job attributes (e.g., finishing, media color, etc.) from distinct sources (e.g., job ticket, pdt, printer queue attributes, global printer job attributes, etc.) based on a precedence model. In the precedence model, the job ticket attributes override attributes found in a print job's PDL (Page Description Language) such as, for example, PostScrip, PCL, and PDF. In some situations, the print job sent to the printer may not render as expected by a client. For example, the print jobs sent to the printer may have been stapled and/or duplexed, but the job attributes related to the print job includes non-stapled and simplex format.

Hence, in order to figure out such an unexpected job processing, various sources of job attributes related to the print job, and more particularly, the precedence model that a given DFE (digital front end) utilize to reconcile the job attributes should be known and the job processing must be manually re-derived. Similarly, in a headless printer system (e.g., a printer without a locally attached operator GUI display screen), re-deriving the job processing outcome is impossible, as the user does not have access to any printer information other than the little information that might have been printed in the print job's banner page. Also, the job attribute information may not be readily available; hence, the user does not possess the ability to figure out the unexpected job processing.

A banner page is, typically, a printed sheet that separates one print job output from another. For example, a banner page may include the name or some other uniquely identifying feature associated with the user who submitted the print job, often in an eye-catching format, so that the user can easily identify and separate his/her print job from other jobs in the printer's output tray. Traditionally, the use of such banner pages has been relatively narrow in scope and purpose, reflecting the capabilities and intended use of the shared printers.

Therefore, a need exists for an improved method and system for automatically printing smart banner pages with print job attributes in order to determine unexpected job processing and to convey general job processing information to an end-user. Such an improved method and system is described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for providing information to a user indicative of a job rendered via a rendering device, such as a printer, scanner, copy machine, and the like.

It is another aspect of the present invention to provide for an improved method and system for automatically generating smart banner pages with job attributes that convey general job processing information to a user.

It is further aspect of the present invention to convey smart banner pages in a table format that includes the source of job attributes and information related to the rendering of a particular job (e.g., print job) via a rendering device.

The aforementioned aspects and other objectives and advantages can now be achieved as described herein. A computer-implemented method and system for conveying information associated with a rendered job is disclosed herein. In general, data can be automatically generated, in response to a request by a user to render a job via a rendering device, wherein the data includes information indicative of the job. Thereafter, the data can be rendered for the user in a displayable format in association with the rendering of the job via the rendering device in order to convey to the user sufficient information indicative of how the job was processed and rendered via the rendering device in the event that the user encounters unexpected processing and rendering of the job. The data indicative of the rendered job can be, for example, information indicative of a precedence model utilized by the rendering device to render the job. Such data can also include, for example, information indicative of the source (or sources) utilized to direct processing and rendering of the job. Such data may also include one or more attributes associated with the job rendered via the rendering device. The displayable format may be provided in the form of smart banner page rendered in association with the job via the rendering device.

Such a method and/or system can therefore be utilized to automatically generate smart banner pages that convey to the user information regarding unexpected job processing including information related to a print job. A rendering system such as, for example, a print system can reconcile job (e.g., print job) attributes for processing a print job from various sources. A smart banner page can be displayed in a table format that includes information such as final print job attributes, sources related to the print job attributes and a precedence model utilized by the print system. The smart banner page can be printed preceding a first page of the print job. The smart banner page can also be utilized in a headless system in order to readily determine unexpected job processing parameters and to convey general job processing information to an end-user.

The job attributes provide information related to the processing of the print job. The sources of the print job attributes can be, for example, job ticket, global printing system settings, printing system queues, and printer description language (PDL). The smart banner page can be enabled in the rendering device utilized in, for example, the office market.

The smart banner page can also be utilized in production or transaction shops in order to expedite analyzing the root-cause of unexpected job processing and to generate information related to job processing.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

FIGS. 1-4 are provided as exemplary diagrams of data processing environments in which embodiments of the present invention may be implemented. It should be appreciated that FIGS. 1-4 are only exemplary and are not intended to assert or imply any limitation with regard to the environments in which aspects or embodiments of the present invention may be implemented. Many modifications to the depicted environments may be made without departing from the spirit and scope of the present invention.

Figure 1:
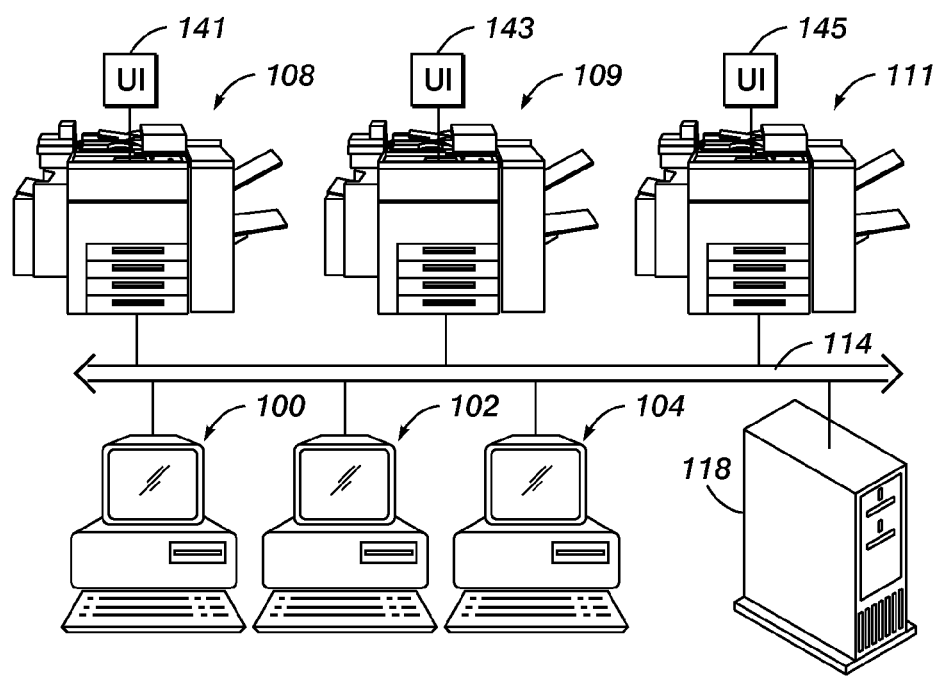
FIG. 1 illustrates a diagram depicting a network of user computers that can selectably operate one or more rendering devices and which may be adapted for use in accordance with a preferred embodiment.

FIG. 1 illustrates a diagram depicting a network of user computers that can selectably operate one or more rendering devices and which may be adapted for use in accordance with a preferred embodiment. Each user computer or data-processing apparatus 100, 102, 104 is capable of sending rendering job data to one or more selected rendering devices 108, 109 and/or 111 over a network 114. Each rendering device 108, 109, and/or 111 can respectively include thereon a local user interface (UI) 141, 143, 145 through which messages can be displayed (including sound messages) and instructions can be entered into a control system associated with the machine. Also available to all the printers on a network 114 is a server 118, which typically is accessed by a systems administrator. As used herein, a "server" is any computer or data-processing apparatus that is capable of retaining and performing operations on a database relating to the printers in a given population.

Figure 2:
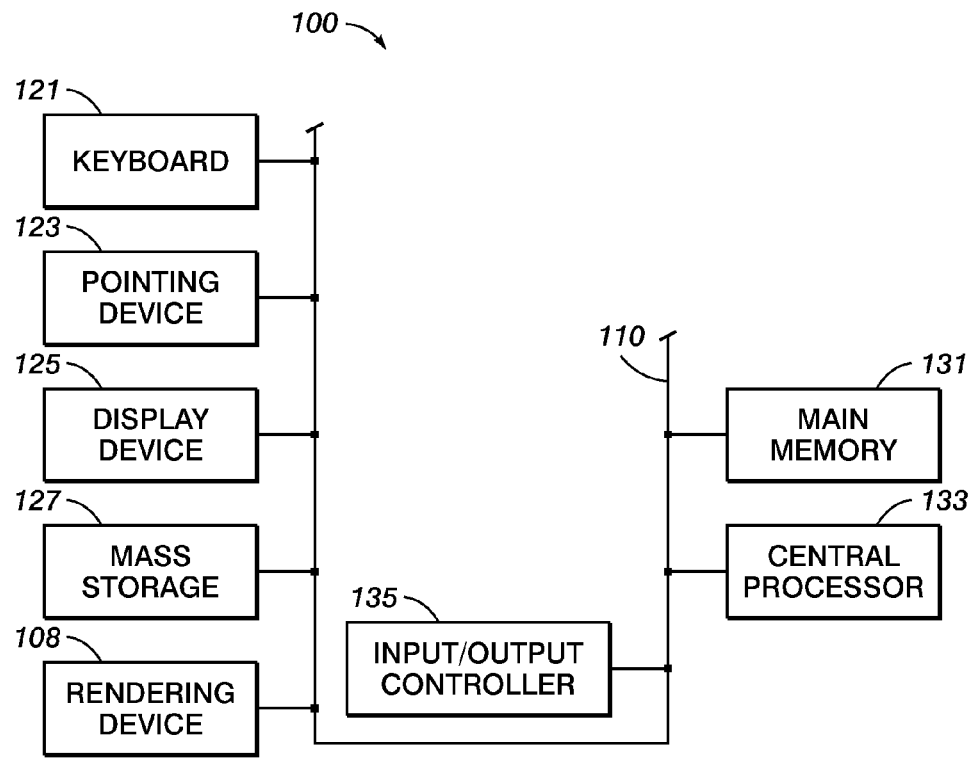
FIG. 2 illustrates a schematic view of a data-processing system in which the present invention may be embodied.

FIG. 2 illustrates the present invention as embodied in the context of a machine, such as data-processing apparatus 100. Note that in FIGS. 1-2, identical or similar parts or elements are generally indicated by identical reference numerals. Data-processing apparatus 100, which is similar to computers 102 and 104, as depicted in FIG. 1, generally includes a central processor 133 and a main memory 131. Alternatively, data-processing apparatus 100 may be implemented as a server, such as, for example, server 118, as depicted in FIG. 1. Data-processing apparatus 100 can also include an input/output controller 135, a keyboard 121, a pointing device 123 (e.g., mouser track ball, pen device, or the like), a display device 125, and a mass storage 127 (e.g., hard disk). Additional input/output devices, such as rendering device 108, may be included in association with the data-processing apparatus 100 as desired. As illustrated, the various components of the data-processing apparatus 100 communicate through a system bus 110 or similar architecture.

Note that rendering devices 108, 109, 111 may constitute, for example, a printer, a copier, fax machine, scanner, and/or other types of rendering components, depending upon design considerations. A rendering job (e.g., a print job) can thus be implemented from data-processing system 100 and rendered via one or more rendering devices 108, 109 and/or 111. One example of a rendering device/system that can be utilized to implement rendering devices 108, 109 and/or 111 is disclosed in U.S. Patent Application No. US20080068417 entitled "Printing System and Method", which is incorporated herein by reference in its entirety, which published on Mar. 20, 2008, and is additionally assigned to the Xerox Corporation. Another example of a rendering device/system that can be utilized to implement data rendering devices 108, 109 and/or 11 is disclosed in U.S. Patent Application Publication No. US20080068641 entitled "Document Processing System", which is incorporated herein by reference in its entirety, which published on Mar. 20, 2008, and is also assigned to the Xerox Corporation.

Figure 3:
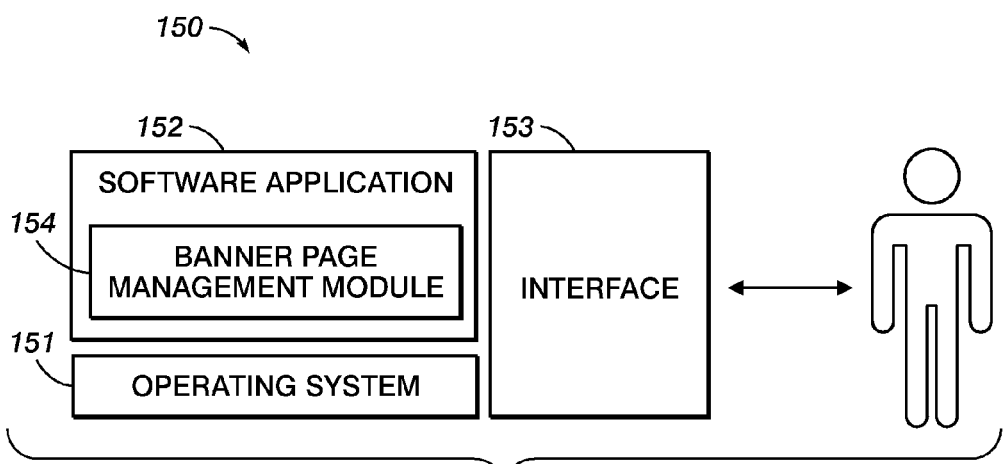
FIG. 3 illustrates a schematic view of a software system including an operating system, application software, and a user interface, which can be adapted for use in carrying out an embodiment of the present invention.

FIG. 3 illustrates a computer software system 150 for directing the operation of the data-processing apparatus 100, as depicted in FIG. 2. Software system 150, which can be stored in system memory 131 and/or on disk memory 127, can include, for example, a kernel or operating system 151 and a shell or interface 153. One or more application programs, such as application software 152, may be "loaded" (i.e., transferred from storage 127 into memory 131) for execution by the data-processing apparatus 100. The data-processing apparatus 100 receives user commands and data through user interface 153; these inputs may then be acted upon by the data-processing system apparatus in accordance with instructions from operating module 151 and/or application module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems, such as, for example, Linux may also be employed with respect to operating system 151 and interface 153. Application module 152 can be a banner page management module 154 that can include instructions, such as the various operations described herein with respect to the various components and modules described herein, such as, for example, the method 400 depicted in FIG. 5.

Figure 4:
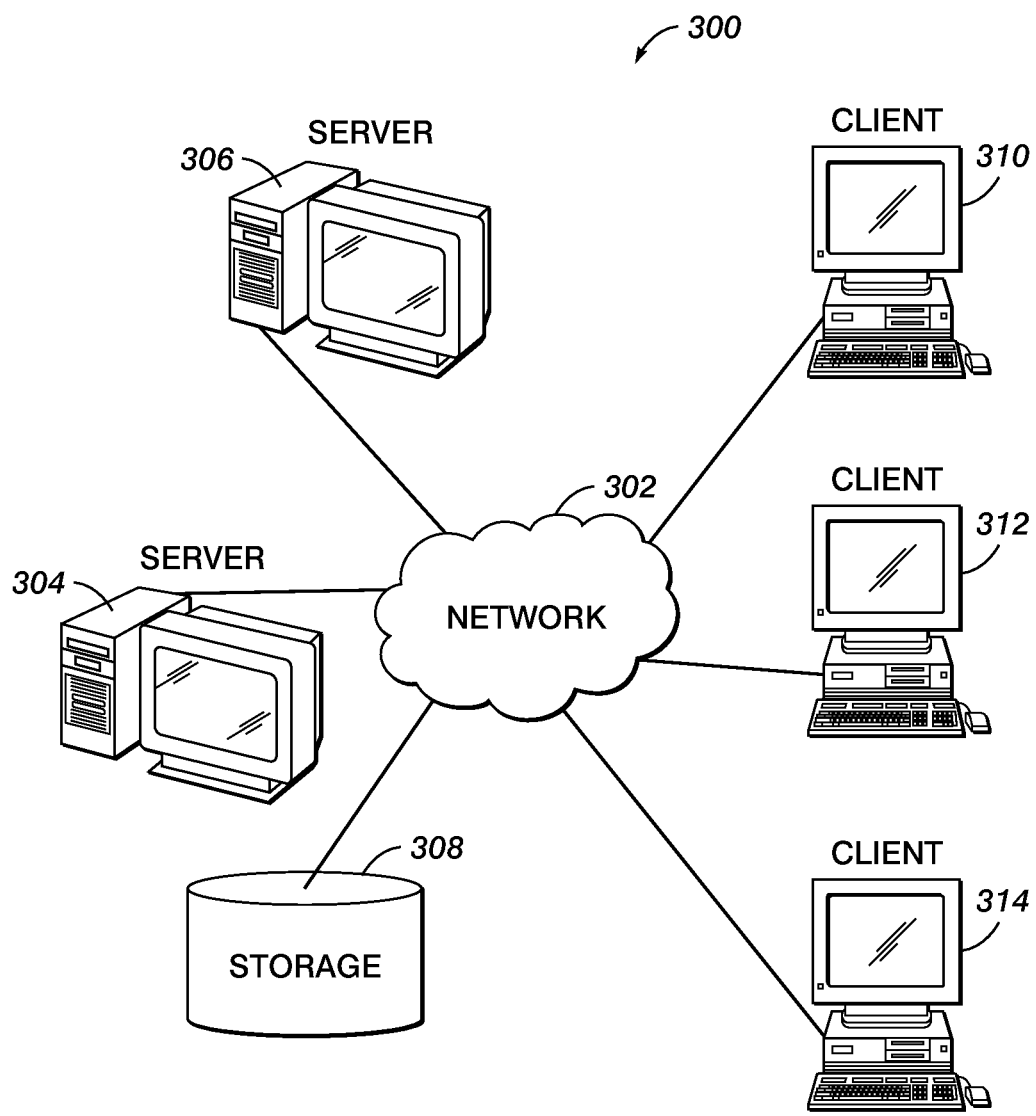
FIG. 4 illustrates a graphical representation of a network of data-processing systems in which aspects of the present invention may be implemented.

FIG. 4 depicts a graphical representation of a network of data processing systems in which aspects of the present invention may be implemented. Network data processing system 300 can be provided as a network of computers in which embodiments of the present invention may be implemented. Network data processing system 300 contains network 302, which is the medium used to provide communications links between various devices and computers connected together within network data processing system 300. Network 302 may include connections, such as, for example, wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100, as depicted in FIG. 2, can be, for example, a client such as client 310, 312, and/or 314. Alternatively, data-processing apparatus 100 can be implemented as a server, such as servers 304 and/or 306, depending upon design considerations. Server 118 is additionally analogous to, for example, servers 304 and/or 306.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as, for example, an intranet, a local area network (LAN), or a wide area network (WAN). FIG. 2 is intended as an example and not as an architectural limitation for different embodiments of the present invention.

The following description is presented with respect to embodiments of the present invention, which can be embodied in the context of a data-processing system such as data-processing apparatus 100, computer software system 150, data processing system 300 and network 302, as depicted respectively in FIGS. 1-4. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 5:
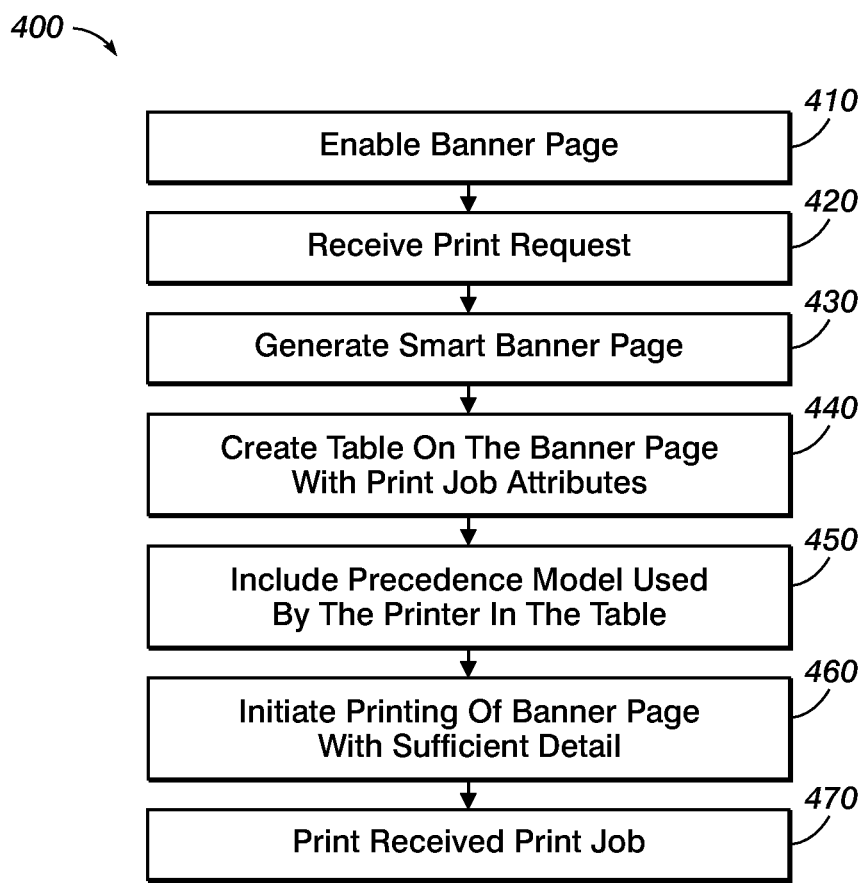
FIG. 5 illustrates a detailed flow chart of operations illustrating logical operational steps of a method for automatically generating smart banner pages with print job attributes and print job processing information, which can be implemented in accordance with a preferred embodiment.

FIG. 5 illustrates a detailed flow chart of operations illustrating logical operational steps of a method 400 for automatically generating smart banner pages with print job attributes and print job processing information, which can be implemented in accordance with a preferred embodiment. Note that the method 400 can be implemented in the context of a computer-useable medium that contains a program product. The method 400 depicted in FIG. 5 can also be implemented in a computer-usable medium containing a program product. As indicated at block 410, a banner page can be enabled via a rendering device, such as, for example, rendering devices 108, 109, and/or 111. As indicated next at block 420, a rendering job (e.g., a print job) can be received. The rendering devices 108, 109 and/or 111 can reconcile print job attributes from various sources for processing and rendering the print job. Note that for purposes of this discussion, it is assumed that rendering devices 108, 109 and/or 111 function primarily or exclusively as printers. It can be appreciated, however, as indicated above, that rendering devices may 108, 109 and/or 111 may also be a copier, fax machine, scanner, etc.

The job attributes provide information related to the processing of the rendered job (i.e., the print job). The sources of the print job attributes can be, for example, a job ticket, global printing system settings, printing system queues, printer description language (PDL) and so forth. A "smart" banner page, such as that depicted in FIG. 6, can be automatically created, as depicted at block 430. The software application 152 can include the banner page management module 154 for banner page generation according to the present invention. In general, the banner page can be automatically created by the banner page management module 154 in a common word processing application such as "Microsoft Word" or "Core Word Perfect" containing static information and dynamic information. However, the banner page document may comprise any information that the user wishes to appear on the printed banner page file such as text, graphics and advertisements, whether static or dynamic.

The banner page management module 154 generates the banner page related to the print job. A table can be created which includes print job attributes and various sources related to the print job attributes and print job processing information by the banner page management module 154, as depicted at block 440. A precedence model utilized by the rendering device 108 for printing the print job can also be included in the banner page table, as depicted at block 450. The printing of the banner page can be initiated with sufficient details as required by the user, as depicted at block 460. The banner page can be printed on one page front of each of the print jobs. The received print job can also be printed, as depicted at block 470. The smart banner page can also be utilized in a headless system in order to readily determine unexpected job processing parameters and to convey additional printer information to an end-user.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 400 described herein can be deployed as process software in the context of a computer system or data-processing system, as depicted in FIGS. 1-3.

Figure 6:
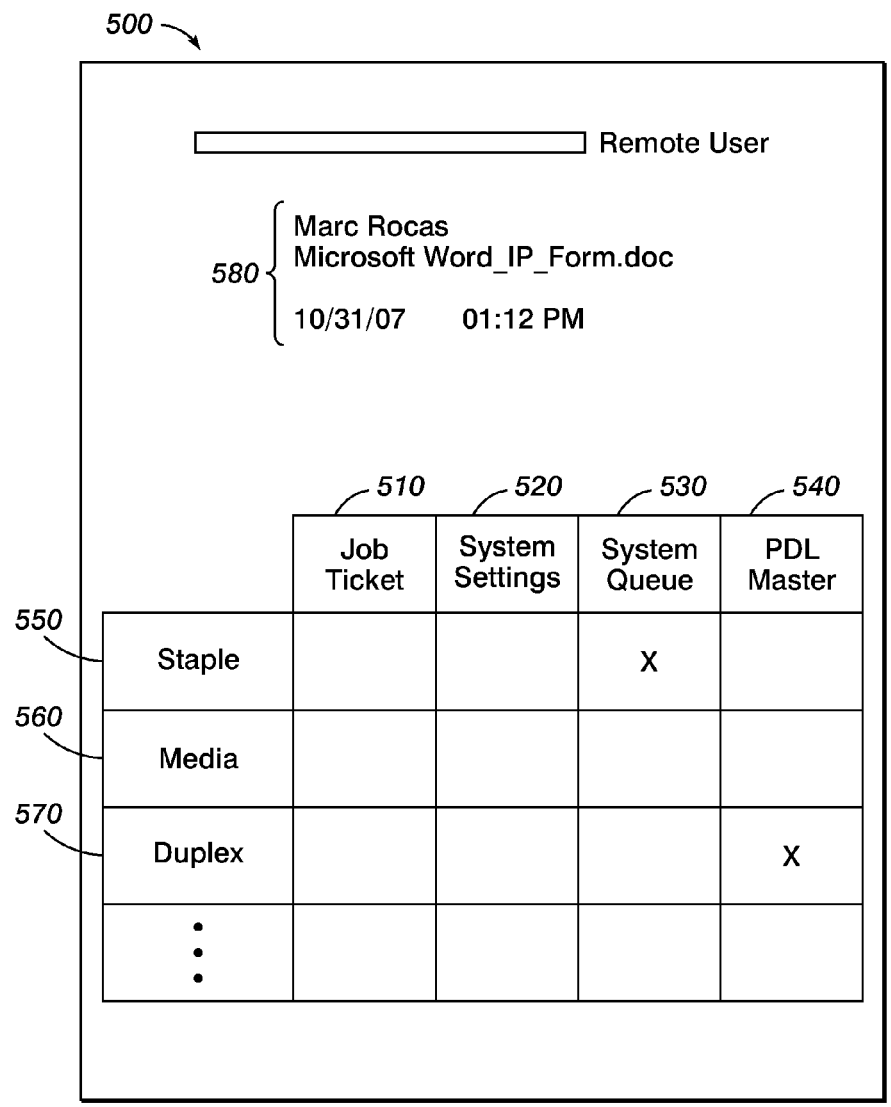
FIG. 6 illustrates an exemplary smart banner page depicting job attribute sources and print job processing information utilized by a printing system, which can be implemented in accordance with a preferred embodiment.

FIG. 6 illustrates an exemplary smart banner page 500 in a table format, which includes job attributes and print job processing information utilized by the rendering device 108, which can be implemented in accordance with a preferred embodiment. The smart banner page 500 includes sources of job attributes such as job ticket 510, system settings 520, system queue 530 and a PDL master 540 and job attributes such as staple 550, media 560 and duplex 570. The jobs sent to the rendering device 108 undergo several steps to reconcile job attributes from distinct sources. The print job processing information can also be re-derived in the smart banner page 500. The exemplary smart banner page 500 illustrates the job attributes utilized by the rendering device 108 for a print job that has been stapled as a result of a queue override 530 as well as printed duplex due to a PDL setting 540, as indicated by "X" in the table. The exemplary smart banner page 500 also includes information 580 such as the name of the user that submitted the print job, print job file name and time at which the print job is printed. The smart banner page 500 illustrated in FIG. 6 is for exemplary purpose only, however, they should not be interpreted in any limiting way.

The smart banner page 500 can be utilized in a headless system in order to figure out unexpected job processing and to convey additional print job information to an end-user. The smart banner page 500 can be enabled in the rendering device 108 utilized in the office market. However, the smart banner page 500 can be utilized in production or transaction shops, in expediting a customer to analyze root-cause of unexpected job processing.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method for conveying information associated with a rendered job, comprising:
    enabling a banner page using a rendering device;
    reconciling a plurality of job attributes provided from at least one source, said plurality of job attributes comprising processing and rendering instructions for a job;
    automatically generating data in response to a request to render said job via said rendering device, said data based on said reconciliation of said plurality of job attributes and, said data including dynamically preselected information and information indicative of said job;
    and thereafter rendering said data in a displayable format in association with a rendering of said job via said rendering device in order to convey sufficient information indicative of how said plurality of job attributes were reconciled, processed, and rendered via said rendering device,
    wherein said displayable format comprises a smart banner page, automatically created with a banner page management module in a word processing application rendered in association with said job via said rendering device.

2. The computer-implemented method of claim 1 wherein said data further comprises information indicative of a precedence model utilized by said rendering device to render said job.

3. The computer-implemented method of claim 1 wherein said data further comprises source information indicative of a job ticket and a system settings utilized to direct processing of said job via said rendering device comprising a job ticket, a global printing system setting, a printing system queue, and a printer description language.

4. The computer-implemented method of claim 1 wherein said data further comprises at least one username, a job file name, and a time said job was rendered associated with said job rendered via said rendering device.

5. The computer-implemented method of claim 1 wherein said smart banner page is displayable in a table format.

6. The computer-implemented method of claim 1 further comprising associating said smart banner page with a headless system in order to analyze a root-cause of an unexpected processing of said job and to convey additional job information to said user.

7. The computer-implemented method of claim 1 further comprising rendering said smart banner page preceding a first rendered page of said job.

8. A system for conveying information associated with a rendered job, comprising:
    a processor;
    a data bus coupled to said processor;
    and a computer-usable medium embodying computer code, said computer-usable medium being coupled to said data bus, said computer program code comprising instructions executable by said processor and configured for:
    enabling a banner page using a rendering device;
    reconciling a plurality of job attributes provided from at least one source, said plurality of job attributes comprising processing and rendering instructions for said job;
    automatically generating data in response to a request to render said e job via a rendering device, said data based on said reconciliation of said plurality of job attributes and, said data including dynamically preselected information and information indicative of said job;
    and thereafter rendering said data in a displayable format in association with a rendering of said job via said rendering device in order to convey sufficient information indicative of how said plurality of job attributes were reconciled, processed, and rendered via said rendering device,
    wherein said displayable format comprises a smart banner page, automatically created with a banner page management module in a word processing application rendered in association with said job via said rendering device.

9. The system of claim 7 wherein said data further comprises information indicative of a precedence model utilized by said rendering device to render said job.

10. The system of claim 7 wherein said data further comprises source information indicative of a job ticket and a system settings utilized to direct processing of said job via said rendering device comprising a job ticket, a global printing system setting, a printing system queue, and a printer description language.

11. The system of claim 7 wherein said data further comprises at least username, a job file name, and a time said job was rendered associated with said job rendered via said rendering device.

12. The system of claim 8 wherein said smart banner page is displayable in a table format.

13. The system of claim 8 wherein said instructions are further configured for associating said smart banner page with a headless system in order to analyze a root-cause of an unexpected processing of said job and to convey additional job information to said user.

14. The system of claim 8 wherein said instructions are further configured for rendering said smart banner page preceding a first rendered page of said job.

15. A non-transitory computer-usable medium for conveying information associated with a rendered job, said non-transitory computer-usable medium embodying computer program code, and comprising computer executable instructions configured for:

enabling a banner page using a rendering device;

reconciling a plurality of job attributes provided from at least one source, said plurality of job attributes comprising processing and rendering instructions for a job;

automatically generating data in response to a request to render said e job via a rendering device, said data based on said reconciliation of said plurality of job attributes and, said data including dynamically preselected information and information indicative of said job;

and thereafter rendering said data in a displayable format in association with a rendering of said job via said rendering device in order to convey sufficient information indicative of how said plurality of job attributes were reconciled, processed, and rendered via said rendering device, wherein said displayable format comprises a smart banner page, automatically created with a banner page management module in a word processing application rendered in association with said job via said rendering device and wherein said smart banner page is displayable in a table format.

16. The non-transitory computer-usable medium of claim 14 wherein said data further comprises information indicative of a precedence model utilized by said rendering device to render said job.

17. The non-transitory computer-usable medium of claim 14 wherein said data further comprises source information indicative of a job ticket and a system settings utilized to direct processing of said job via said rendering device comprising a job ticket, a global printing system setting, a printing system queue, and a printer description language.

* * * * *